Patented Feb. 6, 1951

2,540,776

UNITED STATES PATENT OFFICE 2,540,776

AMIDE RESINS AND RESINOUS VEHICLES THEREOF

Leonard E. Cadwell, Stamford, Conn., assignor to American Cyanamid Company, New York, N. Y., a corporation of Maine No Drawing. Application August 19, 1947, Serial No. 769,541

18 Claims. (Cl. 106—239)

This invention relates to alkylol amides of butendioic-rosin resins, and resinous vehicles thereof suitable for steam-set printing inks. More particularly, this invention is related to amide resins obtained by the distillation-dehydration conversion of the resultant salt obtained by the reaction of butendioic acid-rosin adduct with an alkylol primary amine. Included within the scope of the invention, is the resinous vehicle obtained by dissolving the amide resin in a suitable volatile solvent.

The reaction of hydroxy amines with high acid resins to form resin salts, and the use of these products in steam-set inks is well known in the art. These resins, however, are divided into two general classes, each of which are unsatisfactory for the particular utility of the products of this invention. One group of these prior art resins do not precipitate with steam, and the other group which do precipitate with steam, yield tacky films with poor water resistance. The above disadvantages of the resins of the prior art classes are overcome by this invention, in that these new compositions have improved water tolerance compared with the prior art resins; yet, upon subjection of films from volatile solutions to steam, the resin is precipitated in a dry tack-free state.

Stated generally, the products of this invention are prepared by dispersing a rosin-butendioic acid adduct in a suitable inert organic solvent, such as xylene, and slowly adding an alkylol primary amine, preferably a monoalkylol primary amine, to the dispersion, while maintaining at suitable temperature, until complete conversion to the salt is obtained. The temperature is then gradually raised to convert the resulting salt to the corresponding amide, while removing by distillation, the reaction water formed. When the theoretical amount of water has been removed, a suitable volatile solvent such as a polyhydric alcohol, and preferably diethylene glycol, may be added to dissolve the amide resin. The inert organic solvent is removed by vacuum distillation to provide the resinous vehicle comprising the volatile solution of the amide resin. In lieu of forming the resinous vehicle, the inert solvent may be removed therefrom to form the resinous residue, which may be dissolved in the volatile solvent.

It is believed that the invention will be more understood from the following detailed examples given by way of illustration:

Example 1

| | Parts by weight |
|---|---|
| Maleic acid-rosin adduct | 220 |
| Ethanol amine | 28.7 |
| Xylene | 50 |
| Diethylene glycol | 197 |

The maleic acid-rosin adduct was dissolved in the xylene, and the ethanol amine added dropwise thereto, while maintaining the reaction mixture at 130° C. It took approximately 5 minutes to add all of the ethanol amine. Nine and four tenths (9.4) parts of water were then removed by distillation at 140° C.–152° C. It took approximately 1½ hours to accomplish this distillation. The heat was cut off and the diethylene glycol added, and the apparatus set up for vacuum distillation to remove the xylene. The xylene was removed by heating at 85° C.–115° C., at 45 mm. mercury vacuum. The acid number of this resinous vehicle was 162, the viscosity was $Z_4$, and the water tolerance was 48 cc. of water per 100 grams of solution.

Instead of adding the diethylene glycol in the above example, the xylol could have been removed by vacuum distillation to provide a solid resin having an acid number of 113, and a solidification point of 170.4° C. The viscosity of a 50% solution of this resin in diethylene glycol is $Z_6$, and the viscosity of a 45% solution of this resin with diethylene glycol is $Z_3$–$Z_4$. The resin is also infinitely soluble in ethyl alcohol.

Example 2

| | Parts by weight |
|---|---|
| Water-white gum rosin-maleic acid anhydride adduct | 127.7 |
| Glycerol amine | 25.7 |
| Xylene | 32.0 |

The rosin-maleic adduct, obtained by reacting 100 parts of rosin and 27.7 parts of maleic anhydride, were dissolved in the xylene, and the glycerol amine added thereto dropwise, while maintaining the temperature at 120° C.–130° C. It took approximately 5 minutes to effect this addition. The reaction mixture was then dehydrated at 120° C.–150° C. to remove the water formed by converting the resultant salt to the corresponding amide, after which the xylene was removed by distillation at 200° C. It required approximately 1½ hours to remove the water, and approximately 1 hour to remove the xylol. The resin obtained in this manner had an acid number of 100, and a solidification point at 131° C. A 50% solution of this resin in diethylene glycol had a viscosity of Z-Z$_1$, and a water tolerance of 25.5 cc. per 100 grams of solution.

*Example 3*

| | Parts by weight |
|---|---|
| Maleic acid anhydride-rosin adduct | 127.7 |
| 2-amino butanol | 25.2 |
| Xylene | 32.0 |

The adduct, which was prepared as in the above Example 2, was dissolved in the xylene, and the 2-amino butanol added dropwise thereto, while maintaining the temperature at 130° C.–135° C. It took approximately 10 minutes to effect this addition. Five (5) parts of water were removed by dehydration at 130° C.–150° C., after which the remaining water was distilled off the xylene by distillation at 150° C.–200° C., in the presence of a nitrogen atmosphere. It required approximately 45 minutes to remove the water, and approximately 1 hour and 20 minutes to remove the xylene.

*Example 4*

| | Parts by weight |
|---|---|
| Water-white gum rosin | 100 |
| Fumaric acid | 32.8 |
| 2-methyl-2-aminopropanol | 22.2 |
| Xylene | 30 |
| Diethylene glycol | 142 |

The rosin and fumaric acid were heated at 200° C. for 1 hour. The xylene was then added to the resultant adduct to dissolve it; and, after solution was obtained, the 2-methyl-2-aminopropanol was added thereto dropwise, while maintaining reaction mixture at 130° C.–135° C. It took approximately 15 minutes to add all of the 2-methyl-2-aminopropanol. The reaction salt was then converted to the amide and dehydrated at 135° C.–150° C.; it required approximately 1 hour and 10 minutes to effect this conversion and dehydration. The reaction mixture was then cooled and the diethylene glycol added. The apparatus was then set up for vacuum distillation to remove the xylene which was removed by heating at 130° C., and 30 mm. vacuum. The viscosity of the resin solution (55% solids) was Z$_6$, and had a color index of 13–14.

*Example 5*

| | Parts by weight |
|---|---|
| Rosin-fumaric acid adduct | 121.3 |
| 2-amino-2-methyl-1,3-propanediol | 19.3 |
| Xylene | 35.0 |
| Diethylene glycol | 112 |

The rosin-fumaric adduct, obtained by reaction of 100 parts of water-white gum rosin and 21.3 parts of fumaric acid, were dissolved in the xylene, and the 2-amino-2-methyl-1,3-propanediol was added dropwise thereto, while maintaining the reaction mixture at 130° C.–135° C. It required approximately 15 minutes to effect this dropwise addition. The reaction salt was then converted to the amide and dehydrated at 150° C.–155° C., requiring approximately 1 hour to distill off 12 parts of water. The reaction mixture was then permitted to cool, and the diethylene glycol was added thereto. The apparatus was set up for vacuum distillation, and xylene removed by distilling at 130° C., and 20 mm. mercury vacuum. The resulting resinous solution had a viscosity of Z$_7$–Z$_8$.

Wherein the term "acid" is used herein, it is intended to include the anhydrides thereof, which may be used interchangeably therefor. By like token, when the anhydride is used, the acid may be satisfactorily employed as well.

The amide resins and volatile resinous vehicles thereof are particularly applicable in all types of printing inks herein described where drying is accomplished by the application of steam or moisture to printed surfaces. They are particularly useful in printing inks for food wrappers and containers, where printing and drying are followed by moisture-proofing. Printing inks prepared from these resinous vehicles, display much improved stability at high humidities, by virtue of their high water tolerance, yet they are precipitated completely in a dry form upon the addition of more than a critical amount of water.

I claim:

1. A process comprising reacting a rosin-butendioic acid adduct with an alkylol primary amine to effect the salt thereof, and heat-converting said salt to the corresponding amide.

2. A resinous composition comprising an alkylol amide of rosin-butendioic acid adduct.

3. A process comprising reacting a rosin-fumaric acid adduct with an alkylol primary amine in an inert organic solvent to effect the salt thereof, and converting said salt to the corresponding amide.

4. A resinous composition comprising an alkylol amide of rosin-fumaric acid adduct.

5. A process comprising reacting a rosin-maleic acid adduct with an alkylol primary amine in an inert organic solvent to effect formation to the salt thereof, and converting said salt to the corresponding amide.

6. A resinous composition comprising an alkylol amide of rosin-maleic acid adduct.

7. A process comprising the reaction of an inert organic solution of a rosin-butendioic acid adduct with monoethanol amine, and conversion of the resultant salt to the corresponding amide.

8. A resinous composition comprising the ethylol amide of rosin-butendioic acid adduct.

9. A process comprising the reaction of an inert organic solution of a rosin-butendioic acid adduct with glycerol amine and effecting conversion of the resultant salt to the corresponding amide.

10. A process comprising the reaction of an inert organic solution of a rosin-butendioic acid adduct with 2-amino-2-methyl propanol and effecting conversion of the resultant salt to the corresponding amide.

11. A process comprising the reaction of an inert organic solution of a rosin-butendioic acid adduct with 2-amino-2-methyl-1,3-propanediol, and effecting conversion of the resultant salt to the corresponding amide.

12. A process comprising the reaction of an inert organic solution of a rosin-butendioic acid adduct with 2-amino butanol, and effecting conversion of the resultant salt to the corresponding amide.

13. A resinous vehicle comprising a highly volatile organic solvent, and an alkylol amide of rosin-butendioic adduct dispersed in said solvent.

14. A process for preparing a resinous vehicle for printing inks comprising reacting a rosin-butendioic acid adduct with an alkylol primary amine to effect the salt thereof, converting said salt to the corresponding amide, dehydrating said amide reaction mixture, adding diethylene glycol to said reaction mixture, and removing the inert organic solvent by vacuum distillation.

15. A resinous vehicle comprising a diethylene glycol solution of an ethylol amide of rosin-butendioic acid adduct.

16. A resinous vehicle comprising a diethylene glycol solution of a propanol amide of rosin-butendioic acid adduct.

17. A process comprising reacting a rosin-butendioic acid adduct with a monohydroxy alkylol primary amine to effect the salt thereof, and heat converting said salt to the corresponding amide.

18. A process comprising reacting a rosin-butendioic acid adduct with a polyhydroxy alkylol primary amine to effect the salt thereof, and heat converting said salt to the corresponding amide.

LEONARD E. CADWELL.

REFERENCES CITED

The following references are of record in the file of this patent:

UNITED STATES PATENTS

| Number | Name | Date |
|---|---|---|
| 2,096,749 | Kritchevsky | Oct. 26, 1937 |
| 2,216,617 | Katz | Oct. 1, 1940 |
| 2,422,177 | Blair | June 17, 1947 |

FOREIGN PATENTS

| Number | Country | Date |
|---|---|---|
| 355,281 | Great Britain | Aug. 12, 1931 |